United States Patent
Deguchi et al.

(10) Patent No.: US 12,449,471 B2
(45) Date of Patent: Oct. 21, 2025

(54) METHOD FOR PREDICTING FAILURE OF SEMICONDUCTOR DEVICE, AND SEMICONDUCTOR DEVICE

(71) Applicant: DENSO CORPORATION, Kariya (JP)

(72) Inventors: Masataka Deguchi, Kariya (JP); Junya Muramatsu, Nagakute (JP); Keita Kataoka, Nagakute (JP); Katsuhiro Kutsuki, Nagakute (JP); Isao Aoyagi, Nagakute (JP); Takashi Tominaga, Nagakute (JP); Ryosuke Okachi, Nagakute (JP); Takashi Kohyama, Toyota (JP)

(73) Assignee: DENSO CORPORATION, Kariya (JP)

( * ) Notice: Subject to any disclaimer, the term of this patent is extended or adjusted under 35 U.S.C. 154(b) by 144 days.

(21) Appl. No.: 18/538,012

(22) Filed: Dec. 13, 2023

(65) Prior Publication Data

US 2024/0110970 A1    Apr. 4, 2024

Related U.S. Application Data

(63) Continuation of application No. PCT/JP2022/021079, filed on May 23, 2022.

(30) Foreign Application Priority Data

Jun. 21, 2021   (JP) ................ 2021-102750

(51) Int. Cl.
   *G01R 31/26*   (2020.01)
   *H10D 30/66*   (2025.01)

(52) U.S. Cl.
   CPC ..... *G01R 31/2642* (2013.01); *G01R 31/2623* (2013.01); *G01R 31/2644* (2013.01); *H10D 30/669* (2025.01)

(58) Field of Classification Search
   CPC ........... G01R 31/2642; G01R 31/2623; G01R 31/2621
   USPC ....................... 324/762.09, 762.01
   See application file for complete search history.

(56) References Cited

U.S. PATENT DOCUMENTS

| 2011/0279142 A1* | 11/2011 | Cho ............... G01R 31/261 324/762.01 |
| 2012/0176149 A1 | 7/2012 | Yamayose et al. |
| 2020/0303525 A1* | 9/2020 | Iwakaji ............ H10D 64/516 |

FOREIGN PATENT DOCUMENTS

| JP | 2008-205230 A | 9/2008 |
| JP | 2014-235060 A | 12/2014 |
| JP | 2020-065084 A | 4/2020 |

* cited by examiner

*Primary Examiner* — Roberto Velez
(74) *Attorney, Agent, or Firm* — Oliff PLC

(57) ABSTRACT

Main cells that constitute a semiconductor element having a trench gate structure include first cells, and second cells having a structure in which gate insulating films are more easily broken by energization than those in the first cells, and the number of which is smaller than that of the first cells. At a time of driving the semiconductor element, a common gate drive voltage is applied to gate electrodes of the first cells and the second cells. An electrical characteristic is measured to detect failure of the second cells due to energization at the time of driving. The gate electrodes of the failed second cells are electrically isolated from the gate electrodes of the first cells so that the gate drive voltage is not applied to the failed second cells. The failure of the first cells is predicted based on the failure of the second cells.

8 Claims, 8 Drawing Sheets

METHOD FOR PREDICTING FAILURE OF SEMICONDUCTOR DEVICE, AND SEMICONDUCTOR DEVICE

CROSS REFERENCE TO RELATED APPLICATIONS

The present application is a continuation application of International Patent Application No. PCT/JP2022/021079 filed on May 23, 2022, which designated the U.S. and claims the benefit of priority from Japanese Patent Application No. 2021-102750 filed on Jun. 21, 2021. The entire disclosures of all of the above applications are incorporated herein by reference.

TECHNICAL FIELD

The present disclosure relates to a method for predicting failure of a semiconductor device, and a semiconductor device.

BACKGROUND

Conventionally, there has been known a method for evaluating a lifetime of a MOS semiconductor device having a trench structure.

SUMMARY

A failure prediction method according to a first aspect of the present disclosure is a failure prediction method of a semiconductor device that includes a semiconductor element having a trench gate structure configured by connecting main cells in parallel. The main cells include first cells and second cells. The second cells have a structure in which gate insulating films are more easily broken by energization than gate insulating films in the first cells in order to predict failure of the first cells. The number of the second cells is smaller than the number of the first cells. The failure prediction method includes: applying a gate drive voltage in common to gate electrodes of the first cells and gate electrodes of the second cells at a time of driving the semiconductor element; measuring an electrical characteristic and detecting failure of the second cells due to energization at the time of driving; electrically isolating the gate electrodes of one or more of the second cells that have failed from the gate electrodes of the first cells so that the gate drive voltage is not applied to the one or more of the second cells that have failed; and predicting the failure of the first cells based on the failure of the second cells.

A semiconductor device according to a second aspect of the present disclosure includes a semiconductor element having a trench gate structure configured by connecting main cells in parallel. The semiconductor device includes a semiconductor substrate, gate pads and switches. The semiconductor substrate includes a main cell region and an outer peripheral region surrounding the main cell region. The main cell region is a region where the main cells are disposed and includes first cells and second cells as the main cells. The second cells have a structure in which gate insulating films are more easily broken by energization than gate insulating films in the first cells in order to predict failure of the first cells. The number of the second cells is smaller than the number of the first cells. The gate pads are disposed on one surface of the semiconductor substrate for applying a gate drive voltage to gate electrodes of the main cells. The gate pads include a first pad connected to the gate electrodes of the first cells and second pads disposed separately from the first pad and connected to the gate electrodes of the second cells. The switches include a first switch connected to the first pad and second switches connected to the second pads. The switches are individually disposed for the gate pads and configured to allow or block application of the gate drive voltage to the gate pads. At a time of driving the semiconductor element, all of the switches are turned on when no failure has occurred in the second cells, and only one or more of the second switches corresponding to one or more of the second cells that have failed are turned off and remaining switches in the switches are turned on when failure has occurred in the second cells. At a time of non-driving the semiconductor element, the first switch is turned off and one or more of the second switches are turned on.

A semiconductor device according to a third aspect of the present disclosure includes a semiconductor element having a trench gate structure configured by connecting main cells in parallel. The semiconductor device includes a semiconductor substrate, gate pads, and fuses. The semiconductor substrate includes a main cell region and an outer peripheral region surrounding the main cell region. The main cell region is a region where the main cells are disposed and includes first cells and second cells as the main cells. The second cells have a structure in which gate insulating films are more easily broken by energization than gate insulating films in the first cells in order to predict a failure of the first cells. A number of the second cells is smaller than a number of the first cells. The gate pads are disposed on one surface of the semiconductor substrate for applying a gate drive voltage to gate electrodes of the main cells. The gate pads include a first pad connected to the gate electrodes of the first cells and second pads disposed separately from the first pad and connected to the gate electrodes of the second cells. The fuses are individually connecting the second pads and the first pad. The fuses are configured such that, in association with failure of one or more of the second cells, one or more of the fuses that are connected to one or more of the second pads corresponding to the one or more of the second cells melt.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
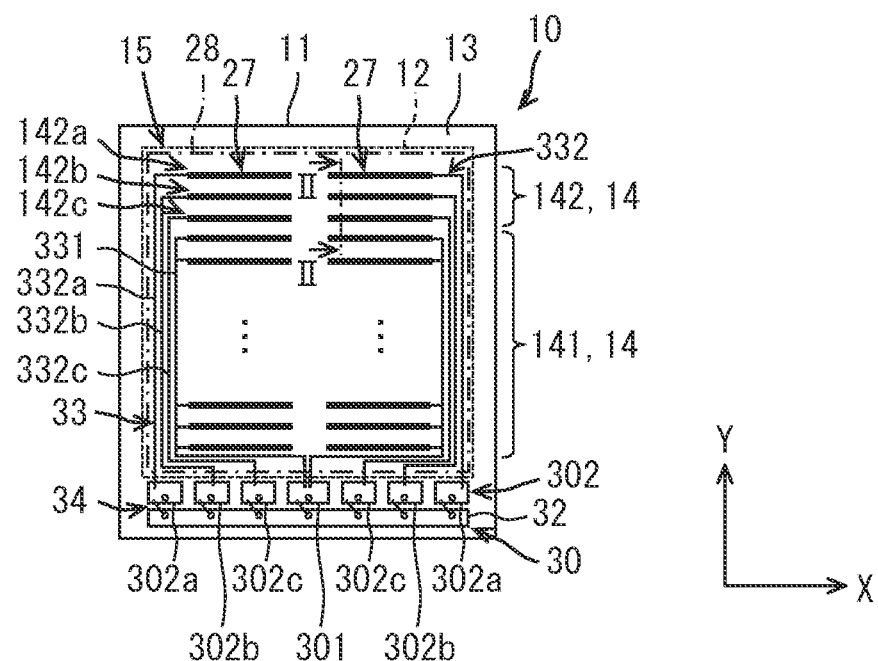
FIG. 1 is a plan view illustrating a semiconductor device according to a first embodiment.

Next, a relevant technology is described only for understanding the following embodiments. A MOS semiconductor device according to the relevant technology includes a main element and a sense element whose gate oxide film has a smaller film thickness than that of the main element, and an acceleration test is performed on the sense element to predict a lifetime of the main element. A stress due to the acceleration test is different from a stress actually applied in the market. In addition, since a stress leading to failure is applied to the sense element by the acceleration test, the sense element cannot be used in the market, and the utilization efficiency of the semiconductor element, that is, the utilization efficiency of the chip area decreases. In view of the above, or in view of other aspects not mentioned, further improvement is required for the method of predicting failure of the semiconductor device, and the semiconductor device.

A failure prediction method according to a first aspect of the present disclosure is a failure prediction method of a semiconductor device that includes a semiconductor element having a trench gate structure configured by connecting main cells in parallel. The main cells include first cells and second cells. The second cells have a structure in which gate insulating films are more easily broken by energization than gate insulating films in the first cells in order to predict failure of the first cells. The number of the second cells is smaller than the number of the first cells. The failure prediction method includes: applying a gate drive voltage in common to gate electrodes of the first cells and gate electrodes of the second cells at a time of driving the semiconductor element; measuring an electrical characteristic and detecting failure of the second cells due to energization at the time of driving; electrically isolating the gate electrodes of one or more of the second cells that have failed from the gate electrodes of the first cells so that the gate drive voltage is not applied to the one or more of the second cells that have failed; and predicting the failure of the first cells based on the failure of the second cells.

According to the failure prediction method according to the first aspect, the gate drive voltage common with the first cells is also applied to the second cells at the time of driving the semiconductor element, and when failure of the second cells is detected, the gate electrodes of the one or more of the second cells that have failed are electrically insulated from the gate electrodes of the first cells. Since the second cells also functions as the main cells constituting the semiconductor element until the failure occurs in the second cells, it is possible to restrict a decrease in utilization efficiency of the semiconductor element.

In addition, the electrical characteristic is measured to detect the failure of the second cell due to energization during driving. Since the second cell fails due to a stress actually applied in the market, failure of the first cell, that is, failure of the semiconductor element can be accurately predicted based on the failure of the second cell.

A semiconductor device according to a second aspect of the present disclosure includes a semiconductor element having a trench gate structure configured by connecting main cells in parallel. The semiconductor device includes a semiconductor substrate, gate pads and switches. The semiconductor substrate includes a main cell region and an outer peripheral region surrounding the main cell region. The main cell region is a region where the main cells are disposed and includes first cells and second cells as the main cells. The second cells have a structure in which gate insulating films are more easily broken by energization than gate insulating films in the first cells in order to predict failure of the first cells. The number of the second cells is smaller than the number of the first cells. The gate pads are disposed on one surface of the semiconductor substrate for applying a gate drive voltage to gate electrodes of the main cells. The gate pads include a first pad connected to the gate electrodes of the first cells and second pads disposed separately from the first pad and connected to the gate electrodes of the second cells. The switches include a first switch connected to the first pad and second switches connected to the second pads. The switches are individually disposed for the gate pads and configured to allow or block application of the gate drive voltage to the gate pads. At a time of driving the semiconductor element, all of the switches are turned on when no failure has occurred in the second cells, and only one or more of the second switches corresponding to one or more of the second cells that have failed are turned off and remaining switches in the switches are turned on when failure has occurred in the second cells. At a time of non-driving the semiconductor element, the first switch is turned off and one or more of the second switches are turned on.

According to the semiconductor device of the second aspect, the gate drive voltage common with the first cells is also applied to the second cells at the time of driving the semiconductor element, and when one or more of the second cells have failed, the application of the gate drive voltages to the one or more of the second cells that have failed can be interrupted. That is, since the second cell also functions as the main cell constituting the semiconductor element until the failure occurs in the second cells, it is possible to restrict a decrease in utilization efficiency of the semiconductor element.

In addition, the second cells fail by operating together with the first cells at the time of driving the semiconductor element. That is, the failure occurs due to stress actually applied in the market. Therefore, it is possible to accurately predict the failure of the first cells, that is, the failure of the semiconductor element, based on the failure of the second cells.

A semiconductor device according to a third aspect of the present disclosure includes a semiconductor element having a trench gate structure configured by connecting main cells in parallel. The semiconductor device includes a semiconductor substrate, gate pads, and fuses. The semiconductor substrate includes a main cell region and an outer peripheral region surrounding the main cell region. The main cell region is a region where the main cells are disposed and includes first cells and second cells as the main cells. The second cells have a structure in which gate insulating films are more easily broken by energization than gate insulating films in the first cells in order to predict a failure of the first cells. The number of the second cells is smaller than the number of the first cells. The gate pads are disposed on one surface of the semiconductor substrate for applying a gate drive voltage to gate electrodes of the main cells. The gate pads include a first pad connected to the gate electrodes of the first cells and second pads disposed separately from the first pad and connected to the gate electrodes of the second cells. The fuses are individually connecting the second pads and the first pad. The fuses are configured such that, in association with failure of one or more of the second cells, one or more of the fuses that are connected to one or more of the second pads corresponding to the one or more of the second cells melt.

According to the semiconductor device of the third aspect, the gate drive voltage common with the first cells can be applied to the second cells through the fuses at the time of driving the semiconductor element. When the second cells fail due to the breakdown of the gate insulating films, the fuses melt, and the application of the gate drive voltage to the one or more of the second cells that have failed can be interrupted. That is, since the second cells also functions as the main cells constituting the semiconductor element until the failure of the second cells occurs, it is possible to restrict a decrease in utilization efficiency of the semiconductor element.

In addition, the second cells fail by operating together with the first cells at the time of driving the semiconductor element. That is, the failure occurs due to stress actually applied in the market. Therefore, it is possible to accurately predict the failure of the first cells, that is, the failure of the semiconductor element, based on the failure of the second cells.

The disclosed aspects in this specification adopt different technical solutions from each other in order to achieve their respective objectives. Reference numerals in parentheses described in claims and this section exemplarily show corresponding relationships with parts of embodiments to be described later and are not intended to limit technical scopes. The objects, features, and advantages disclosed in this specification will become apparent by referring to following detailed descriptions and accompanying drawings.

Hereinafter, multiple embodiments will be described with reference to the drawings. The same reference numerals are assigned to the corresponding elements in each embodiment, and thus duplicate descriptions may be omitted. When only part of the configuration is described in each embodiment, the configuration of the other preceding embodiments can be applied to other parts of the configuration. Further, not only the combinations of the configurations explicitly shown in the description of the respective embodiments, but also the configurations of the multiple embodiments can be partially combined even when they are not explicitly shown as long as there is no difficulty in the combination in particular.

First Embodiment

First, a schematic configuration of a semiconductor device will be described.

<Semiconductor Device>

Figure 2:
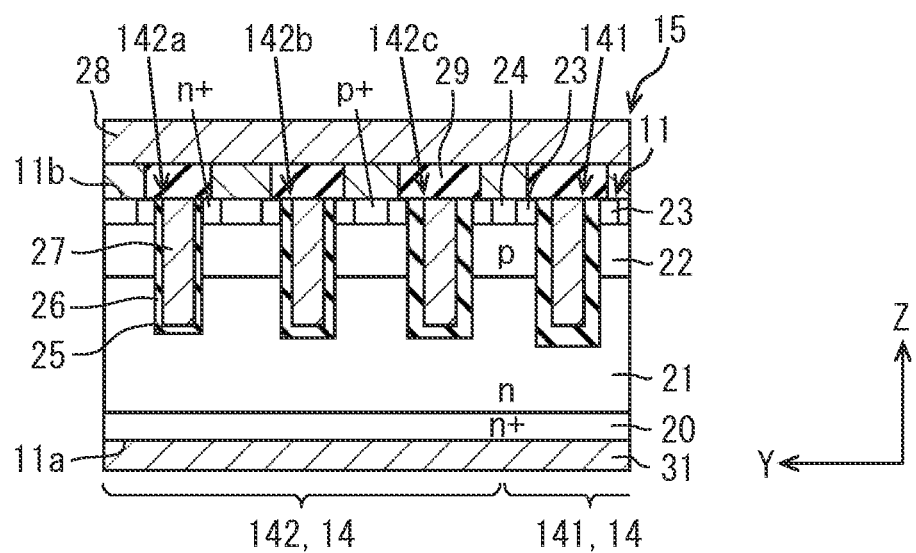
FIG. 2 is a cross-sectional view of the semiconductor device taken along line II-II of FIG. 1.

Next, a structure of the semiconductor device will be described with reference to FIG. 1 and FIG. 2. FIG. 1 is a plan view illustrating the semiconductor device. In FIG. 1, in order to show connections between gate electrodes and gate wiring lines, a protective film and an interlayer insulating film on the semiconductor substrate are omitted, and a source electrode is shown by a dashed-dotted line. In addition, switches disposed on the semiconductor substrate are illustrated in a simplified manner. FIG. 2 is a cross-sectional view of the semiconductor device taken along line II-II of FIG. 1.

Hereinafter, a thickness direction of the semiconductor substrate is defined as a Z direction. A direction in which trenches are arranged in parallel and that is orthogonal to the Z direction is referred to as a Y direction. A direction orthogonal to both the Z direction and the Y direction is defined as an X direction. A plan view in the Z direction is simply referred to as a plan view unless otherwise specified.

As illustrated in FIG. 1, a semiconductor device 10 includes a semiconductor substrate 11. The semiconductor substrate 11 is also referred to as a semiconductor chip. The semiconductor substrate 11 is made of silicon (Si), a wide bandgap semiconductor having a wider bandgap than silicon, or the like. Examples of wide bandgap semiconductors include silicon carbide (SiC), gallium nitride (GaN), gallium oxide (Ga2O3) and diamond.

The semiconductor substrate 11 includes a main cell region 12 and an outer peripheral region 13. The outer peripheral region 13 surrounds the main cell region 12 in the plan view. The outer peripheral region 13 is a region outside an outer peripheral end of the main cell region 12, that is, a broken line illustrated in FIG. 1. Although not illustrated, a high breakdown voltage structure portion such as a guard ring is formed in the outer peripheral region 13.

The main cell region 12 may be referred to as an element formation region, an element region, a main region, an active region, or the like. In the main cell region 12, main cells 14 are disposed. The main cells 14 may be referred to as unit cells, unit structure portions, unit circuits, elements, or the like. The main cells 14 are connected in parallel to each other to form a semiconductor element 15 having a trench gate structure. The semiconductor device 10 includes the semiconductor element 15.

The semiconductor element 15 of the present embodiment is a MOSFET formed on the semiconductor substrate 11 made of SiC. The semiconductor element 15 having the trench gate structure is not limited to the MOSFET. For example, an IGBT may be employed instead of the MOSFET. MOSFET is an abbreviation for Metal Oxide Semiconductor Field Effect Transistor. IGBT is an abbreviation for Insulated Gate Bipolar Transistor.

As illustrated in FIG. 2, the semiconductor substrate 11 includes a drain region 20, a drift region 21, a base region 22, a source region 23, and a base contact region 24. The semiconductor substrate 11 is formed by forming semiconductor regions made of SiC on the SiC substrate by, for example, epitaxial growth, ion implantation of impurities, or the like. The semiconductor regions may be referred to as semiconductor layers, diffusion layers, or the like. The semiconductor substrate 11 has one surface 11a and a rear surface 11b as main surfaces (plate surfaces). The rear surface 11b is a surface opposite to the one surface 11a in the Z direction.

The drain region 20 forms the one surface 11a of the semiconductor substrate 11. The drain region 20 is an n-conductivity type (n+) semiconductor region having a higher impurity concentration than the drift region 21.

The drift region 21 is formed on a surface of the drain region 20 opposite to the surface forming the one surface 11a. The drift region 21 is an n-conductivity type (n) semiconductor region having a lower impurity concentration than the drain region 20. The drain region 20 and the drift region 21 are disposed in substantially the entire region of the semiconductor substrate 11 in plan view.

The base region 22 is formed on a surface of the drift region 21 opposite to the surface close to the drain region 20. The base region 22 is a semiconductor region of p-conductivity type (p). The base region 22 is disposed mainly in the main cell region 12 of the semiconductor substrate 11. The base region 22 is disposed in a surface layer of the semiconductor substrate 11 close to the rear surface 11b. When the n-conductivity type is a first conductivity type, the p-conductivity type is a second conductivity type.

The source region 23 is disposed in a surface layer of the base region 22 close to the rear surface 11b. The source region 23 is an n-conductivity type (n+) semiconductor region having a higher impurity concentration than the drift region 21.

The base contact region 24 is disposed in the surface layer of the base region 22 close to the rear surface 11b. The base contact region 24 is disposed adjacent to the source region 23. The base contact region 24 is a p-conductivity type (p+) semiconductor region having a higher impurity concentration than the base region 22. The source region 23 and the base contact region 24 are disposed in the main cell region 12. The semiconductor substrate 11 of the present embodiment has the base contact region 24 as an example, but may have a configuration without the base contact region 24.

Trenches 25 are formed in the semiconductor substrate 11 having the above-described structure. The trenches 25 are formed with a predetermined depth from the rear surface 11b. The trenches 25 penetrate the source region 23 and the base region 22. Tips of the trenches 25 reaches the drift region 21. The base region 22 and the source region 23 are formed to be in contact with side surfaces of the trenches 25. The trenches 25 are formed in the main cell region 12 of the semiconductor substrate 11. Each of the trenches 25 extends in the X direction. The trenches 25 are arranged at substantially equal intervals in the Y direction, and form a stripe shape in the plan view. The trenches 25 are arranged in two columns.

The trenches 25 are formed mainly in the main cell region 12. The trenches 25 define the main cells 14. Each of the main cells 14 includes one trench 25, and the main cells 14 are arranged in parallel in the Y direction.

Gate insulating films 26 are formed on wall surfaces of the trenches 25. Gate electrodes 27 are formed on surfaces of the gate insulating films 26 to fill the trenches 25. The gate electrodes 27 penetrate the source region 23 and the base region 22 and reaches the drift region 21. The gate electrodes 27 are formed in the main cell region 12 of the semiconductor substrate 11. Each of the gate electrodes 27 extends in the X direction. The gate electrodes 27 are arranged at substantially equal intervals in the Y direction and have a stripe shape in the plan view. The gate electrodes 27 are arranged in two columns.

A source electrode 28 is formed on the rear surface 11b of the semiconductor substrate 11. The source electrode 28 is formed mainly on the main cell region 12. The source electrode 28 is electrically connected to the source region 23. The source electrode 28 is electrically connected to the base region 22 via the base contact region 24. The source electrode 28 is electrically isolated from the gate electrodes 27 by interlayer insulating films 29. Pads serving as signal electrodes are also formed on the rear surface 11b of the semiconductor substrate 11. The pads include gate pads 30.

A drain electrode 31 is formed on the one surface 11a of the semiconductor substrate 11. The drain electrode 31 is formed on almost the entire surface of the one surface 11a. The drain electrode 31 is electrically connected to the drain region 20.

As described above, in each of the main cells 14 of the semiconductor substrate 11, a MOS structure portion including the gate electrode 27 having a trench structure is formed. The main cells 14 are connected in parallel to each other to form the semiconductor element 15 having the trench gate structure, specifically, a vertical n-channel MOSFET.

The semiconductor device 10 can be applied to a power conversion circuit such as an inverter or a converter.

<Main Cell>

Next, the main cells 14 will be described with reference to FIG. 1 and FIG. 2.

As illustrated in FIG. 1 and FIG. 2, the main cells 14 are disposed in the main cell region 12 of the semiconductor substrate 11. The main cells 14 are connected in parallel to each other. The main cells 14 include first cells 141 and second cells 142, the number of which is smaller than the number of the first cells 141. Most of the main cells 14 are the first cells 141, and the remaining cells are the second cells 142.

The first cells 141 are main portions that function as the semiconductor element 15. The first cells 141 occupy most of the main cell region 12. The first cells 141 have a common structure. The first cells 141 may be referred to as normal structure portions, normal element portions, standard cells, or the like.

The second cells 142 are main cells 14 disposed to predict failure of the first cells 141. In order to predict failure of the first cells 141, the second cells 142 have a structure in which the gate insulating films 26 are more easily broken by energization than the first cells 141. The second cells 142 may be referred to as detection structure portions, detection element portions, failure detection portions, detection cells, or the like. The second cells 142 function as the semiconductor element 15 together with the first cells 141 until failure occurs. The main cells 14 includes at least one type of second cells 142.

The main cells 14 of the present embodiment includes the second cells 142 whose gate insulating films 26 are different in breakability from each other. The second cells 142 include three types of second cells 142a, 142b, and 142c having different thicknesses of the gate insulating films 26. In the second cells 142a, 142b, and 142c, the sizes of the gate electrodes 27 are substantially the same as each other, and the thicknesses of the gate insulating films 26 are different from each other because the sizes of the trenches 25 are different from each other.

When the thickness of the gate insulating film 26 decreases, an electric field applied to the gate insulating film 26 increases, and dielectric breakdown easily occurs. As illustrated in FIG. 2, the gate insulating films 26 of the second cells 142a, 142b, and 142c are all thinner than the gate insulating films 26 of the first cells 141. The gate insulating films 26 of the second cells 142a are the thinnest, and the gate insulating films of the second cells 142b are the second thinnest. The thicknesses of the gate insulating films 26 satisfy the relationship of the second cells 142a<the second cells 142b<the second cells 142c<the first cells 141.

As illustrated in FIG. 1, the second cells 142 are disposed at an end portion of the main cell region 12 in the direction in which the main cells 14 are arranged in parallel, that is, in the Y direction. In the present embodiment, the main cells 14 corresponding to the three gate electrodes 27 from the end portion of the main cell region 12 on the side far from the gate pads 30 are the second cells 142. The second cells 142a are disposed at a position farthest from the gate pads 30 in the Y direction. The second cells 142b are disposed between the second cells 142a and 142c. All of the main cells 14 closer to the gate pads 30 than the second cells 142c are the first cells 141.

<Gate Pads and Connection Structure Thereof>

Figure 3:
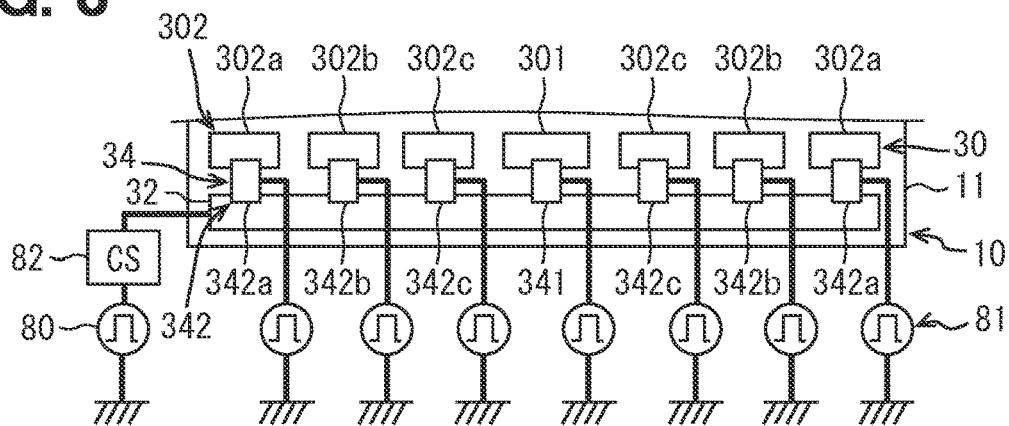
FIG. 3 is a diagram illustrating the periphery of gate pads.

Next, the gate pads 30 and the connection structure between the gate pads 30 and the gate electrodes 27 will be described with reference to FIG. 1 and FIG. 3. FIG. 3 is a diagram illustrating the periphery of the gate pads.

The gate pads 30 are pads connected to the gate electrodes 27 via gate wiring lines described later. The gate pads 30 include a first pad 301 and second pads 302. The first pad 301 is electrically connected to the gate electrodes 27 of the first cells 141 of the main cells 14. The second pads 302 are electrically connected to the gate electrodes 27 of the second cells 142 of the main cells 14.

The second pads 302 of the present embodiment include second pads 302a, 302b, and 302c. The second pads 302a are electrically connected to the gate electrodes 27 of the second cells 142a. The second pads 302b are electrically connected to the gate electrodes 27 of the second cells 142b. The second pads 302c are electrically connected to the gate electrodes 27 of the second cells 142c.

The semiconductor device 10 further includes a common pad 32, gate wiring lines 33, and switches 34. The common pad 32 is a pad to which the gate pads 30 are commonly connected. The common pad 32 is applied with a gate drive voltage from a driving circuit (driver) (not shown).

The semiconductor device 10 of the present embodiment includes one first pad 301, two second pads 302a, two second pads 302b, two second pads 302c, and one common pad 32. The first pad 301 and the second pads 302 are arranged in the X direction. Specifically, the second pad 302a, the second pad 302b, the second pad 302c, the first pad 301, the second pad 302c, the second pad 302b, and the second pad 302a are arranged in this order from one end side. The first pad 301 and the second pads 302, and the common pad 32 are arranged in the Y direction. In the Y direction, the common pad 32 is disposed close to an end portion of the semiconductor substrate 11, and the first pad 301 and the second pads 302 are disposed close to the main cell region 12.

The gate wiring lines 33 electrically connect the gate electrodes 27 and the gate pads 30. The gate wiring lines 33 include first wiring lines 331 and second wiring lines 332. The first wiring lines 331 electrically connect the gate electrodes 27 of the first cells 141 and the first pad 301. The second wiring lines 332 electrically connect the gate electrodes 27 of the second cells 142 and the second pads 302.

The second wiring lines 332 of the present embodiment includes second wiring lines 332a, 332b, and 332c. The second wiring lines 332a electrically connect the gate electrodes 27 of the second cells 142a and the second pads 302a. The second wiring lines 332b electrically connect the gate electrodes 27 of the second cells 142b and the second pads 302b. The second wiring lines 332c electrically connect the gate electrodes 27 of the second cells 142c and the second pad 302c. As described above, since the gate electrodes 27 are arranged in two columns, the two first wiring lines 331 and the two second wiring lines 332a, 332b, and 332c are provided.

The switches 34 allow or block application (input) of the gate drive voltage to the gate pads 30. The switches 34 are disposed individually for the gate pads 30. In the present embodiment, the switches 34 are disposed in conduction paths between the common pad 32 and the gate pads 30. Ones of main terminals of the switches 34, for example, drain terminals are connected to the common pad 32, and another ones of the main terminals, for example, source terminals are connected to the gate pads 30.

The switches 34 are formed on the rear surface 11b of the semiconductor substrate 11. The switches 34 are, for example, horizontal MOSFETs. Each of the switches 34 includes a semiconductor thin film, a gate electrode, a gate insulating film, and the like arranged in multiple layers. In the semiconductor thin film, a base region, a drain region, and a source region are formed by doping impurities.

The switches 34 include a first switch 341 and second switches 342. The first switch 341 is disposed in the conduction path between the common pad 32 and the first pad 301. When the first switch 341 is turned on, the common pad 32 and the first pad 301 are electrically connected (conducted), and when the first switch 341 is turned off, the electrical connection between the common pad 32 and the first pad 301 is interrupted.

The second switches 342 are disposed in the conduction paths between the common pad 32 and the second pads 302. The second switches 342 are disposed individually for the second pads 302. The second switches 342 of the present embodiment include second switches 342a, 342b, and 342c. The second switches 342a are disposed in the conduction paths between the common pad 32 and the second pads 302a. When the second switches 342a are turned on, the common pad 32 and the second pads 302a are electrically connected to each other, and when the second switches 342a are turned off, the electrical connections between the common pad 32 and the second pads 302a are interrupted.

Similarly, the second switches 342b are disposed in the conduction paths between the common pad 32 and the second pads 302b. When the second switches 342b are turned on, the common pad 32 and the second pads 302b are electrically connected to each other, and when the second switches 342b are turned off, the electrical connections between the common pad 32 and the second pads 302b are interrupted.

<Opening and Closing Patterns of Switches>

Figure 4:
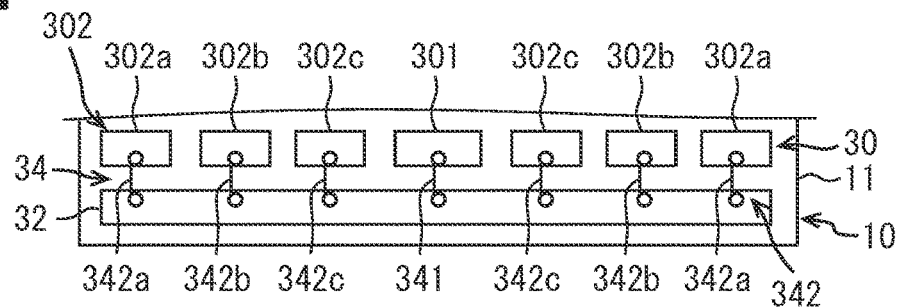
FIG. 4 is a diagram illustrating an example of an opening and closing pattern of switches at a time of driving.
Figure 5:
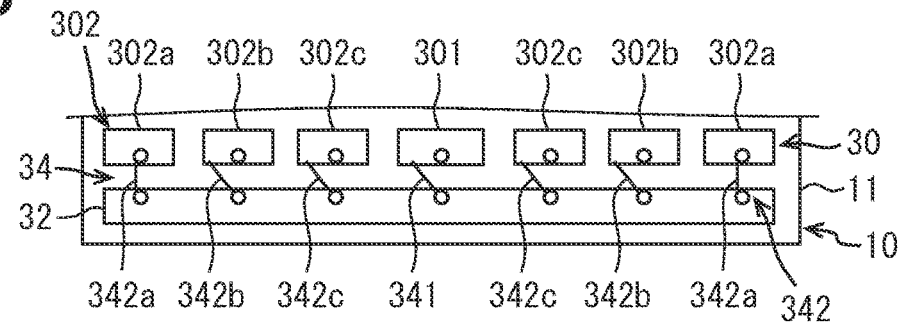
FIG. 5 is a diagram illustrating an example of an opening and closing pattern of the switches at a time of non-driving.
Figure 6:
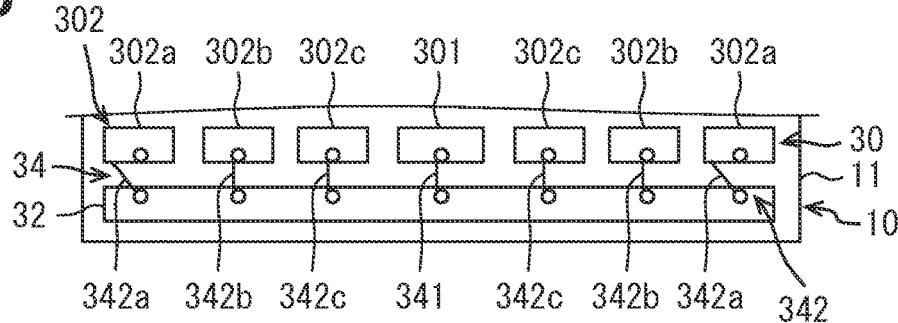
FIG. 6 is a diagram illustrating an example of an opening and closing pattern of the switches at the time of driving when failure occurs in second cells.

Next, opening and closing patterns of the switches 34 will be described with reference to FIGS. 3 to 6. FIG. 4 illustrates an opening and closing pattern of the switches 34 when the semiconductor element 15 is driven and no failure occurs in the second cells 142. FIG. 5 illustrates an opening and closing pattern of the switches 34 when the second cells 142 are operated (detection operation) during non-driving of the semiconductor element 15. FIG. 6 illustrates an opening and closing pattern of the switches 34 when the semiconductor element 15 is driven and failure occurs in a part of the second cells 142. In FIGS. 4 to 6, the switches 34 are illustrated in a simplified manner.

As illustrated in FIG. 3, a gate drive voltage for driving, that is, driving on and off the semiconductor element 15 is supplied from a gate drive power source 80. The gate drive power source 80 is a power source for applying the gate drive voltage to the gate electrodes 27 of the semiconductor element. The gate drive power source 80 generates the gate drive voltage based on a control command from a control circuit (not shown), and outputs the gate drive voltage to the common pad 32 of the semiconductor device 10.

On the other hand, gate drive voltages for turning on and off the respective switches 34 are supplied from switch power sources 81. The switch power sources 81 are provided individually for the switches 34. The switch power sources 81 are electrically connected to the gate electrodes of the corresponding switches 34.

A current sensor 82 is disposed between the gate drive power source 80 and the common pad 32. The current sensor 82 detects a gate current Igs as an electrical characteristic. Failure of the second cells 142 can be detected based on a detection value of the current sensor 82. At least one of the gate drive power source 80, the switch power sources 81, and the current sensor 82 is formed in, for example, the driving circuit of the semiconductor element 15.

The semiconductor element 15 is driven to supply power to a load (for example, a motor) which is not illustrated. When the semiconductor element 15 is driven, power is supplied to the load. The driving time may be referred to as a normal operation time, a normal use time, or the like. When the semiconductor element 15 is driven and no failure occurs in the second cells 142, as illustrated in FIG. 4, the first switch 341 is turned on and all the second switches 342 are turned on. Thus, the gate drive voltage is applied from the gate drive power source 80 to the gate electrodes 27 of the first cells 141 via the common pad 32, the first switch 341, and the first pad 301. Furthermore, the gate drive voltage is applied from the gate drive power source 80 to the gate electrodes 27 of the respective second cells 142 via the common pad 32, the second switches 342, and the second pads 302. Therefore, all the main cells 14 function as the semiconductor element 15.

In the present embodiment, the detection operation of the second cells 142 is performed during a period in which power is not supplied to the load, that is, at a time of non-driving the semiconductor element 15. As illustrated in FIG. 5, only the second switches 342 corresponding to the second cells 142 to be subjected to the detection operation are turned on, and the other switches 34 are turned off. In the present embodiment, the multiple types of second cells 142a, 142b, and 142c are sequentially subjected to the detection operation. FIG. 5 illustrates, as an example, an opening and closing pattern of the switches 34 when the second cells 142a are subjected to the detection operation.

As illustrated in FIG. 5, only the second switches 342a are turned on, and the other second switches 342b and 342c and the first switch 341 are turned off. Thus, the gate drive voltage is applied from the gate drive power source 80 to the gate electrodes 27 of the second cells 142a via the common pad 32, the second switches 342a, and the second pads 302a. Therefore, only the second cells 142a of the main cells 14 operate. The current sensor 82 detects a current flowing through the gate electrodes 27 of the second cells 142a of the main cells 14. Failure of the second cells 142a can be detected by comparing the gate current detected by the current sensor 82 with a threshold value for determining dielectric breakdown. Specifically, when the gate current exceeds the threshold value, it is determined that failure occurs in the second cells 142a.

The threshold may be set so as to detect a state in which dielectric breakdown occurs in the gate insulating film 26 and a short circuit occurs between the gate and the source, or may be set so as to detect a state in which there is a sign of dielectric breakdown.

Similarly, when only the second switches 342b are turned on and the other second switches 342a and 342c and the first switch 341 are turned off, the gate drive voltage is applied only to the gate electrodes 27 of the second cells 142b. Accordingly, it is possible to detect failure of the second cells 142b. When only the second switches 342c are turned on and the other second switches 342a and 342b and the first switch 341 are turned off, the gate drive voltage is applied only to the gate electrodes 27 of the second cells 142c. Accordingly, it is possible to detect failure of the second cell 142c.

After the failure of the second cells 142 is detected, the switching pattern of the switches 34 in the driving state is switched so that the gate drive voltage is not applied to the failed second cells 142 at the time of driving the semiconductor element 15. For example, when failure of the second cells 142a is detected, as illustrated in FIG. 6, the second switches 342a corresponding to the failed second cells 142a are turned off, and the remaining second switches 342b and 342c and the first switch 341 are turned on. Accordingly, the main cells 14 except for the failed second cells 142a, that is, the first cells 141 and the second cells 142b and 142c function as the semiconductor element 15.

<Failure Prediction Method>

Figure 7:
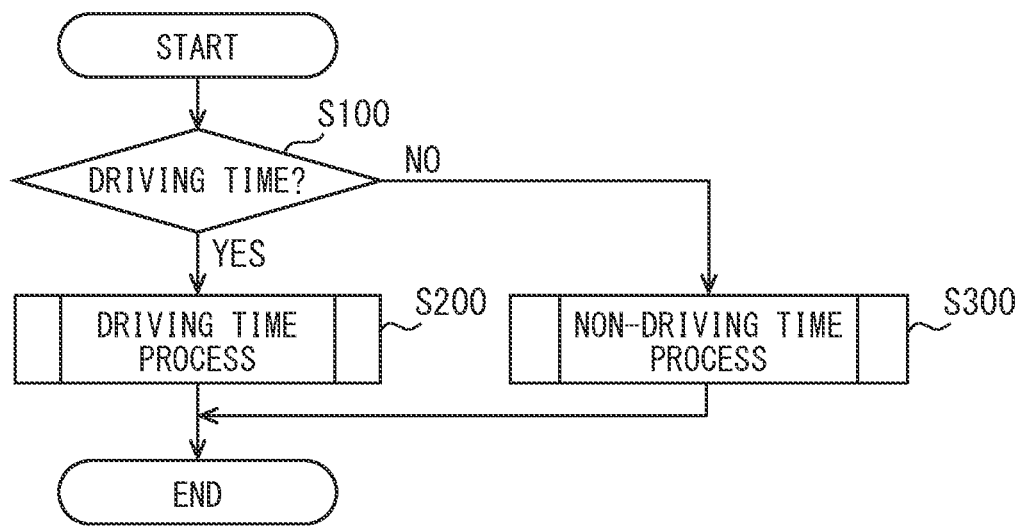
FIG. 7 is a flowchart showing a failure prediction method.
Figure 8:
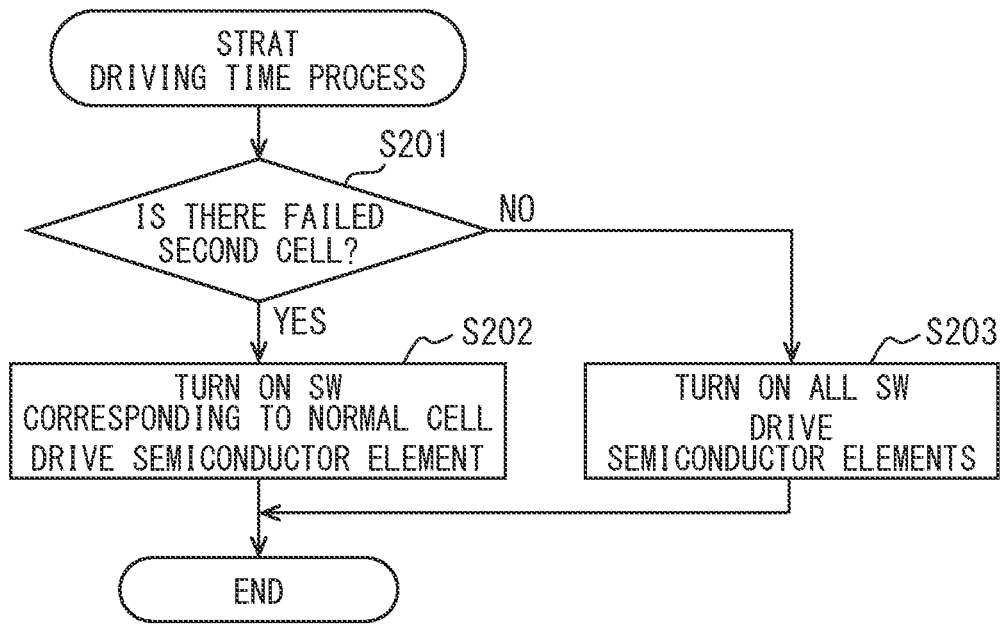
FIG. 8 is a flowchart showing a driving time process.
Figure 9:
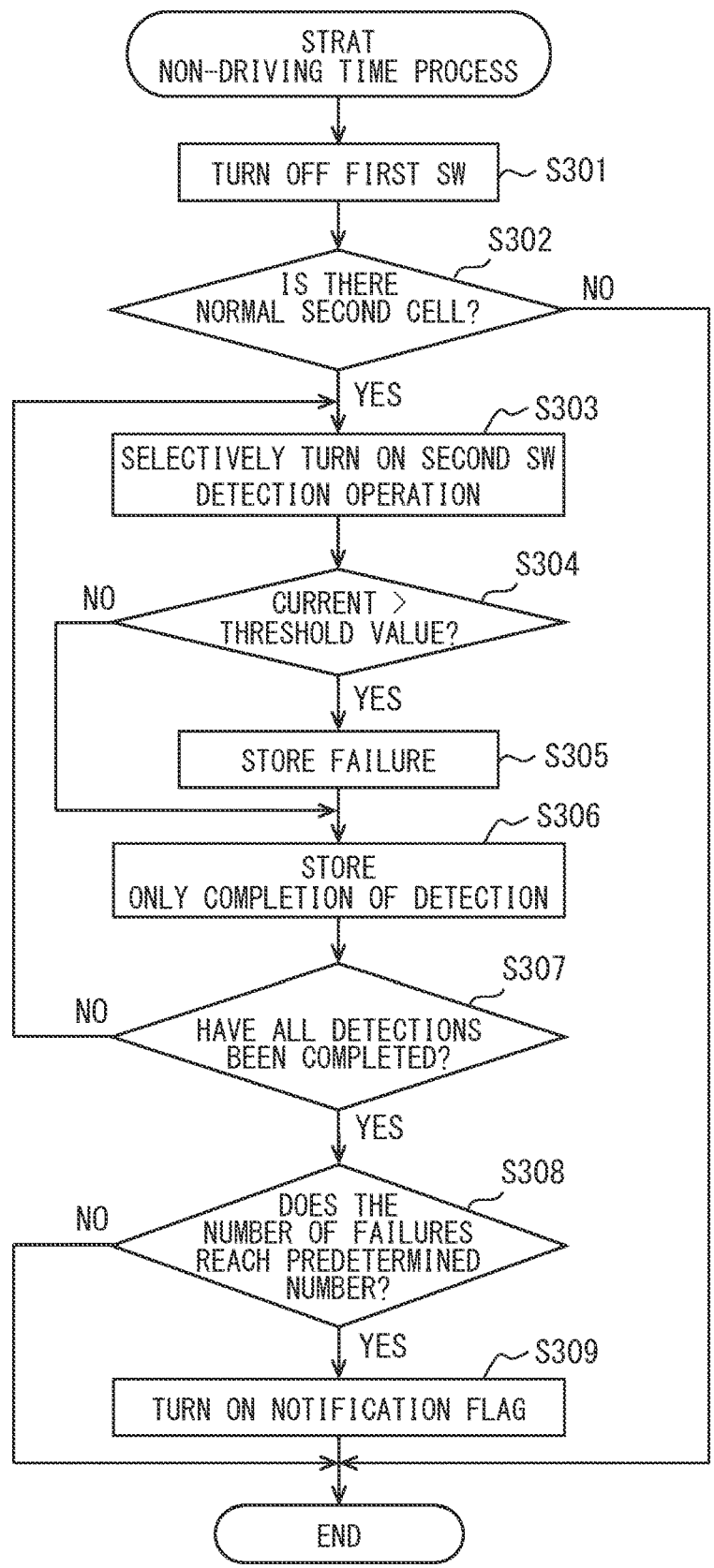
FIG. 9 is a flowchart showing a non-driving time process.

Next, a failure prediction method of the semiconductor device 10 will be described with reference to FIGS. 7 to 9. FIG. 7 is a flowchart showing an example of the failure prediction method. FIG. 8 is a flowchart showing a driving time process. FIG. 9 is a flowchart showing a non-driving time process. The failure prediction method described below may be executed at a timing of switching between driving and non-driving of the semiconductor element 15, or may be repeatedly executed at a predetermined cycle.

As illustrated in FIG. 7, it is first determined whether or not it is a driving time (step S100). When it is the driving time, the driving time process, that is, a normal use time process is executed (step S200), and the process of the example ends. When it is the non-driving time, the non-driving time process, that is, a detection time process is executed (step S300), and the series of processes is ended.

As illustrated in FIG. 8, in the driving time process, first, it is determined whether or not there is a failed second cell 142 (step S201). The failed second cell 142 is the second cell 142 in which failure is detected in the non-driving time process. Information on the failed second cell 142 is stored in the memory in the non-driving process described later.

When there is the failed second cell 142, the switches 34 corresponding to the non-failed main cells 14, that is, the normal cells are turned on to drive the semiconductor element 15 (step S202). As illustrated in FIG. 6, the second switch 342 corresponding to the failed second cell 142 is turned off. As a result, the gate electrode 27 of the failed second cell 142 is electrically isolated from the gate electrodes 27 of the other main cells 14 including the first cells 141, and the gate drive voltage is not applied. The main cells 14 except for the failed second cell 142 function as the semiconductor element 15.

On the other hand, when there is no failed second cell 142, all the switches 34 are turned on to drive the semiconductor elements 15 (step S203). As illustrated in FIG. 4, the first switch 341 is turned on, and all of the second switches 342 are turned on. Thus, all the main cells 14 function as the semiconductor element 15. When the process of step S202 or step S203 ends, the driving time process ends.

As illustrated in FIG. 9, in the non-driving time process, first, the first switch 341 is turned off (step S301). As a result, the gate drive voltage is not applied to the gate electrodes 27 of the first cells 141.

Next, it is determined whether or not there is a second cell 142 in which a failure has not occur, that is, a normal second cell 142 (step S302).

When there is a normal second cell 142, the second switch 342 is selectively turned on, and only the normal second cell 142 corresponding to the turned-on second switch 342 is operated, that is, the detection operation is performed (step S303). Specifically, in order to operate (perform detection operation of) the second cell 142 in which the detection operation is not performed in the current flow and in which the gate insulating film 26 is most easily broken among the normal second cells 142, the corresponding second switch 342 is turned on.

For example, when the detection operation has not been performed for all the second cells and none of the second cells 142 has failed, as illustrated in FIG. 5, only the second switches 342a are turned on so that the second cells 142a, whose gate insulating films 26 are most easily broken, perform the detection operation. When the second switches 342a are turned on, the gate drive voltage is applied only to the gate electrodes 27 of the second cells 142a, and only the second cells 142a operate to detect failure. When there is only one (one type of) normal second cell 142, the second switch 342 corresponding to the normal second cell 142 is turned on.

Next, the gate current (current) is measured during the detection operation, and it is determined whether or not the measured current value exceeds a threshold value for determining dielectric breakdown (step S304). For example, when the second cells 142a are in the detection operation, the current value measured by the current sensor 82 is the value of the current flowing through the gate electrodes 27 of the second cells 142a.

When the current exceeds the threshold value, it is determined that a failure has occurred, and the failure of the second cell 142 that has performed the detection operation is stored (step S305). Next, it is stored that the detection operation has been completed for the second cell 142 selected in step S303 (step S306). When the current does not exceed the threshold value in step S304, the process of step S306 is executed without executing the process of step S305.

After execution of step S306, it is determined whether or not all the normal second cells 142 have performed the detection operation, that is, whether or not all the detections have been completed (step S307). When there remains a normal second cell 142 for which the detection operation has not been performed, the process returns to step S303 and the subsequent processes are performed again.

When the detection is completed, it is determined whether or not the number of the second cells 142 whose failure is detected reaches a predetermined number (step S308). When the number of failed second cells 142 reaches the predetermined number, it is predicted that there is a high risk of failure of the first cells 141. That is, failure of the first cells 141 is predicted. In the case of the present embodiment, when all of the three types of second cells 142a, 142b, and 142c have failed, it is predicted that there is a high risk of failure of the first cells 141.

Then, a flag for notification is turned on (step S309), and the non-driving time process ends. By turning on the flag, an external notification is executed. For example, the abnormality is notified by display, voice, or the like. The notification prompts a user of the vehicle to replace the semiconductor device 10, for example.

When the number of failed second cells 142 has not reached the predetermined number in step S308, the non-driving time process is ended without execution of the process of step S309. On the other hand, when there is no normal second cell 142 in step S302, the non-driving time process is ended without execution of the process of step S303 and subsequent steps.

In the non-driving time process, the order of the process of step S301 and the process of step S302 may be reversed. That is, the process of step S301 may be executed after the process of step 302 is executed.

In the process of step S304, an example in which the value of the gate current and the threshold value are compared to determine the failure of the second cells 142, that is, the breakdown of the gate insulating films 26 has been described, but the present disclosure is not limited thereto. For example, a non-linear method such as a neural network may be used for the determination.

The failure prediction method described above may be implemented by computer-executable instructions. In one embodiment, a non-transitory computer-readable medium is configured to store computer-executable instructions that, when executed by a machine, such as a processor, a computer, and the like, causes the machine and/or associated components to perform the method. A failure prediction device may be configured to include a processor and a memory that stores a program including instructions to be executed by the processor.

Summary of First Embodiment

As described above, according to the failure prediction method of the semiconductor device 10 according to the present embodiment, the gate drive voltage common with the first cells 141 is also applied to the second cells 142 at the time of driving the semiconductor element 15. When failure of the second cells 142 is detected, the gate electrodes 27 of the failed second cells 142 are electrically isolated from the gate electrodes 27 of the first cells 141. Since the second cells 142 also function as the main cells 14 constituting the semiconductor element 15 until the failure occurs in the second cells 142, it is possible to restrict a decrease in the utilization efficiency of a chip area, that is, a decrease in the utilization efficiency of the semiconductor element 15.

In addition, the electrical characteristic is measured to detect failure of the second cells 142 due to energization at the time of driving. As described above, when the semiconductor element 15 is driven, the second cells 142 are driven in the same manner as the first cells 141. Thus, the second cells 142 fail due to the stress actually applied in the market. Therefore, it is possible to accurately predict failure of the first cells 141, that is, failure of the semiconductor element 15 based on the failure of the second cells 142.

As described above, according to the failure prediction method of the semiconductor device 10 according to the present embodiment, it is possible to accurately predict failure while restricting a decrease in the utilization efficiency of the semiconductor element 15.

Incidentally, the gate insulating film is determined to be broken when dielectric breakdown occurs due to electric field concentration during the operation of the semiconductor element and a short circuit occurs between the gate and the source. When a short circuit occurs, the function as a switching device is lost. Such failure is likely to occur at an end portion where stress is likely to be concentrated in the semiconductor element. The semiconductor element is configured by connecting main cells (unit structures) in parallel. However, when the temperature rises due to current concentration caused by the short circuit and the main cells are broken over a wide range, the semiconductor element cannot be used.

On the other hand, in the present embodiment, when failure of the second cells 142 is detected, the gate electrode 27 of the failed second cell 142 is electrically separated from the first cells 141 so that the gate drive voltage is not applied. As a result, it is possible to restrict failure of the other main cells 14 due to the temperature rise caused by the failure of the second cell 142. That is, it is possible to accurately predict failure of the first cells 141 while maintaining the function as the semiconductor element 15.

In the present embodiment, the main cells 14 include the second cells 142 (142a, 142b, 142c) in which the gate insulating films 26 are different in breakability from each other. Then, based on failure of the second cells 142, failure of the first cell 141 is predicted. Ideally, the second cells 142 break in time series in the order of breakabilities of the gate insulating films 26, for example, in the order of thickness of the gate insulating films 26. Therefore, the degree of progress of failure of the entire semiconductor element can be estimated based on failure of the second cells 142. Therefore, the prediction accuracy of failure can be further improved.

In the present embodiment, when the number of the failed second cells 142 reaches the predetermined number, failure of the first cell 141 is predicted. As described above, since the second cells 142 are broken in time series, the degree of progress of the failure can be estimated by the number of the failed second cells 142. That is, failure of the first cell 141 can be predicted.

In the present embodiment, notification is performed when failure of the first cells 141 is predicted. Accordingly, it is possible to prompt the user of the vehicle to replace the semiconductor device 10.

In the present embodiment, when the semiconductor element 15 is driven, the first switch 341 connected to the gate electrodes 27 of the first cells 141 is turned on, and the second switches 342 connected to the gate electrodes 27 of the second cells 142 are turned on. Accordingly, the common gate drive voltage is applied to the first cells 141 and the second cells 142. In addition, when the semiconductor element 15 is not driven, the first switch 341 is turned off and the gate drive voltage is applied to only the second cells 142 for which the second switches 342 are turned on to measure the electrical characteristic, and failure of the second cells 142 due to energization during driving is detected. Then, by turning off the second switches 342 corresponding to the failed second cells 142, the failed second cells 142 are electrically isolated from the first cells 141.

In this manner, by selectively turning on and off the switches 34 (341, 342), it is possible to operate the second cells 142 at the time of driving and to operate only the second cells 142 at the time of non-driving to detect failure and to prevent the gate drive voltage from being applied to the failed second cells 142. At the time of non-driving, the first cells 141 are not operated, and only the second cells 142 for which the second switches 342 are turned on are operated. Therefore, failure of the second cells 142 can be accurately detected by measuring the electrical characteristic.

The semiconductor device 10 according to the present embodiment is configured to be capable of executing the failure prediction method described above. The main cells 14 include the first cells 141 and the second cells 142, the number of which is smaller than the number of the first cells 141. The gate pads 30 include the first pad 301 connected to the gate electrodes 27 of the first cells 141 and the second pads 302 disposed separately from the first pads 301 and connected to the gate electrodes 27 of the second cells 142. The semiconductor device 10 further includes the switches 34 individually connected to the gate pads 30. The switches 34 include the first switch 341 connected to the first pad 301 and the second switches 342 connected to the second pads 302.

At the time of driving the semiconductor element 15, when no failure occurs in the second cells 142, all the switches 34 are turned on, and when failure occurs, only the second switches 342 corresponding to the failed second cells 142 are turned off, and the remaining switches 34 are turned on. At the time of non-driving the semiconductor element 15, the first switch 341 is turned off and the second switches 342 are turned on.

In the present embodiment, an example in which the second cells 142 whose gate insulating films 26 are different in breakability from each other are disposed has been described, but the present disclosure is not limited thereto. Only one type of second cell 142 may be disposed, or two types of second cells 142 may be disposed. Four or more types of second cells 142 may be disposed.

Although an example in which the semiconductor device 10 includes the common pad 32 has been described, the present disclosure is not limited thereto. A configuration in which the common pad 32 is eliminated may be employed. In this case, the switches 34 are individually connected to the driving circuit via wiring members such as bonding wires.

Second Embodiment

The present embodiment is a modification of the preceding embodiment as a basic configuration and may incorporate description of the preceding embodiment. In the preceding embodiment, the semiconductor device 10 includes the switches 34. Alternatively, the switches 34 may be eliminated.

Figure 10:
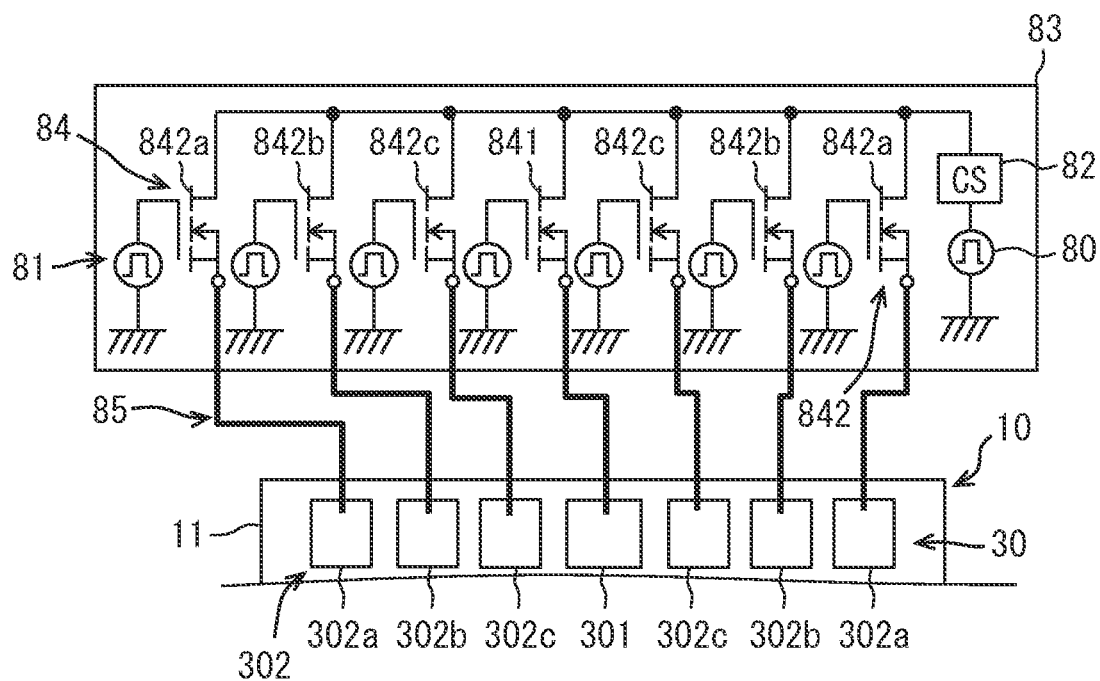
FIG. 10 is a diagram illustrating the periphery of gate pads in a semiconductor device according to a second embodiment.

FIG. 10 is a diagram illustrating the periphery of gate pads 30 in a semiconductor device 10 according to the present embodiment. FIG. 10 illustrates a connection structure between the semiconductor device 10 and a drive circuit 83.

The drive circuit 83 is configured on a circuit board. The drive circuit 83 may be referred to as a gate drive circuit, a driver, a gate driver, or the like. The drive circuit 83 includes the gate drive power source 80, the switch power sources 81, and the current sensor 82 described above. The drive circuit 83 further includes switches 84. The switches 84 are disposed individually for the gate pads 30. The switches 84 correspond to the switches 34 described above.

The switches 84 include a first switch 841 and second switches 842. The second switches 842 include second switches 842a, 842b, and 842c. The first switch 841 corresponds to the first switch 341, and the second switches 842 correspond to the second switches 342. The second switches 842a, 842b, and 842c correspond to the second switches 342a, 342b, and 342c, respectively.

The switches 84 are disposed between the gate drive power source 80 and the gate pads 30. The switches 84 are connected in parallel to each other. Ones of main terminals of the switches 84, for example, drain terminals are connected to the gate drive power source 80. Another ones of the main terminals, for example, source terminals are connected to corresponding gate pads 30 via wiring members 85 such as bonding wires. The switch power sources 81 are individually connected to gates of the switches 84.

Summary of Second Embodiment

According to the above configuration, the failure prediction method described in the preceding embodiment can be executed. Specifically, at a time of driving the semiconductor element 15, a common gate drive voltage is applied to the first cells 141 and the second cells 142 by turning on the first switch 841 and turning on the second switches 842. In addition, at a time of non-driving the semiconductor element 15, the first switch 841 is turned off and the gate drive voltage is applied to only the second cells 142 for which the second switches 842 are turned on to measure the electrical characteristics, and failure of the second cell 142 due to energization at the time of driving is detected. Then, by turning off the second switches 842 corresponding to the failed second cells 142, the failed second cells 142 are electrically isolated from the first cells 141.

In this manner, by selectively turning on and off the switches 84 (841, 842), it is possible to operate the second cells 142 at the time of driving and to operate only the second cells 142 at the time of non-driving to detect failure, and to prevent the gate drive voltage from being applied to the failed second cell 142.

Third Embodiment

The present embodiment is a modification of the preceding embodiments as a basic configuration and may incorporate description of the preceding embodiments. In the preceding embodiment, the gate drive voltage is not applied to the failed second cell 142 by turning off the switch 34 or 84. Alternatively, there may be a configuration in which the gate drive voltage is not applied to the failed second cell 142 by melting of the fuse.

<Semiconductor Device>

Figure 11:
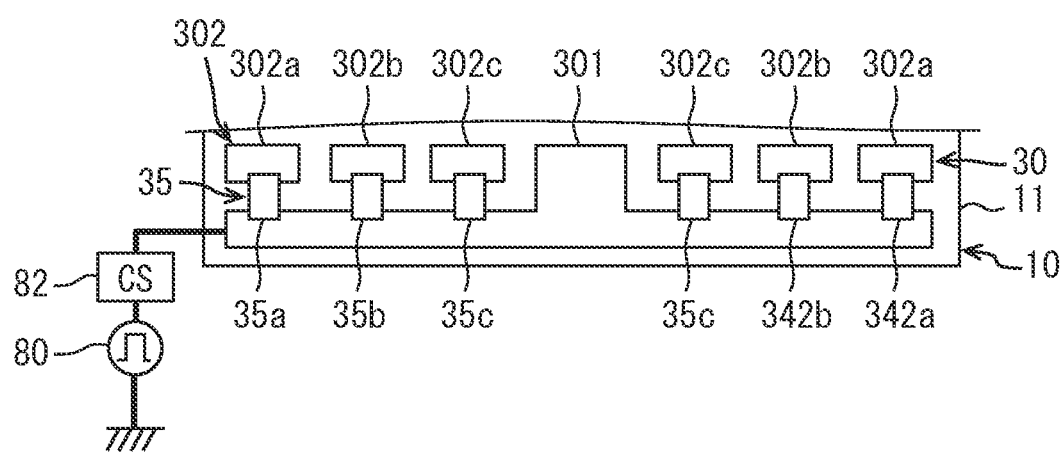
FIG. 11 is a diagram illustrating the periphery of gate pads in a semiconductor device according to a third embodiment.

FIG. 11 is a diagram illustrating the periphery of the gate pads 30 in a semiconductor device 10 according to the present embodiment. FIG. 11 corresponds to FIG. 3.

As illustrated in FIG. 11, the semiconductor device 10 does not include the common pad 32 and the switches 34. Although not illustrated, the main cells 14 of the present embodiment include the first cells 141 and the second cells 142 (142a, 142b, 142c) as in the preceding embodiment. In addition, the gate pads 30 include the first pad 301 and the second pads 302 (302a, 302b, 302c).

The semiconductor device 10 includes fuses 35. The fuses 35 may be referred to as current fuses. The fuses 35 individually connect the second pads 302 and the first pad 301. The semiconductor device 10 of the present embodiment includes multiple fuses 35 (35a, 35b, 35c). The fuses 35a connect the second pads 302a and the first pad 301. The fuses 35b connect the second pads 302b and the first pad 301. The fuses 35c connect the second pads 302c and the first pad 301.

When a current exceeding a rated current value flows, the fuses 35 locally generate heat and melt to interrupt the circuit. The fuses 35 melt when a current exceeding a rated current value flows due to a short circuit between the gate and the source due to dielectric breakdown of the gate insulating films 26 in the corresponding second cells 142.

As illustrated in FIG. 11, the gate drive power source 80 is connected to the first pad 301. The current sensor 82 for detecting the gate current Igs is disposed in a conduction path between the first pad 301 and the gate drive power source 80. Since the switches 34 are not disposed, the switch power sources 81 are unnecessary.

<Failure Prediction Method>

Figure 12:
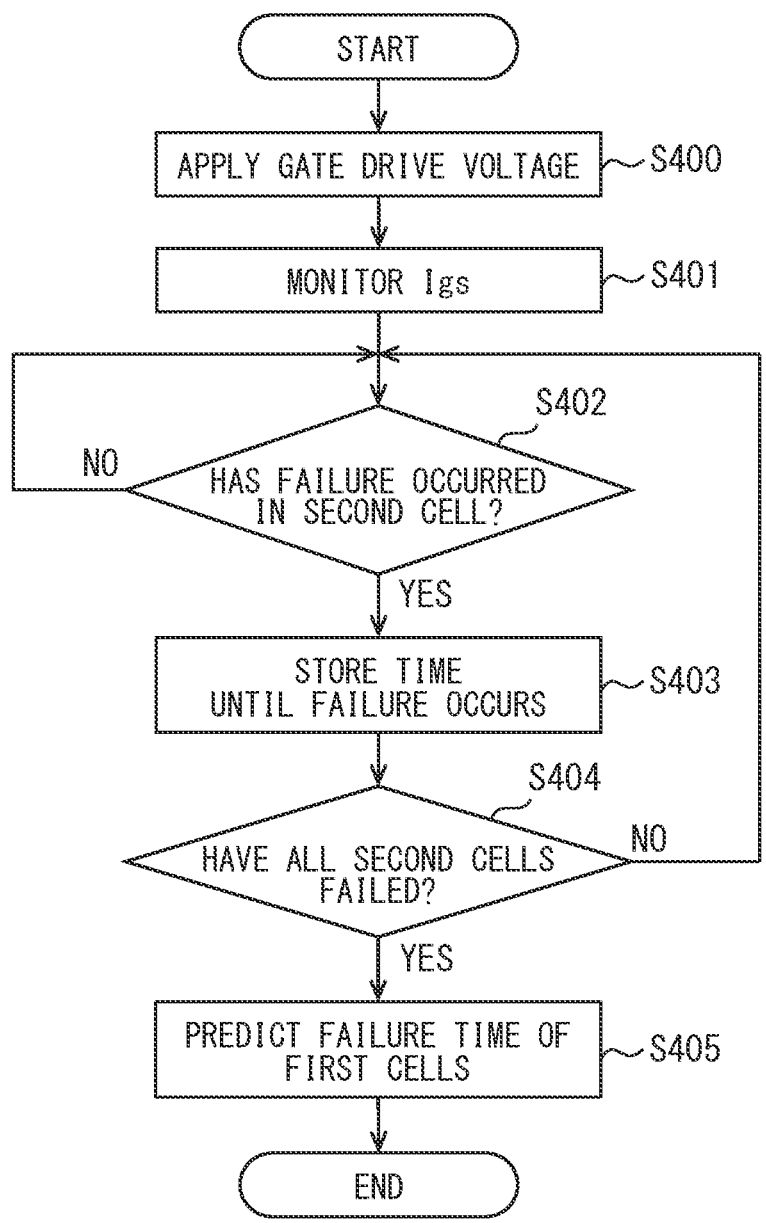
FIG. 12 is a flowchart showing a failure prediction method.
Figure 13:
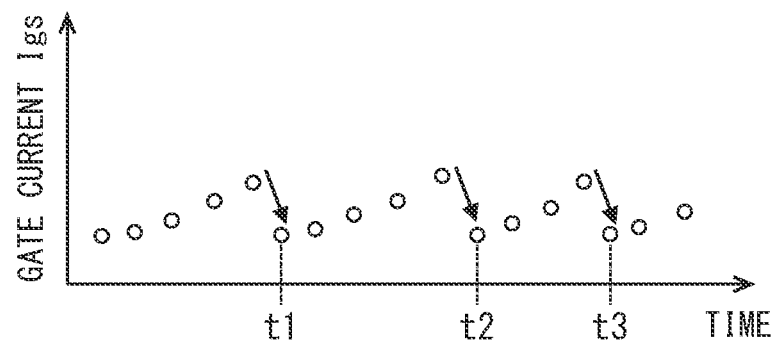
FIG. 13 is a diagram illustrating a failure detection.
Figure 14:
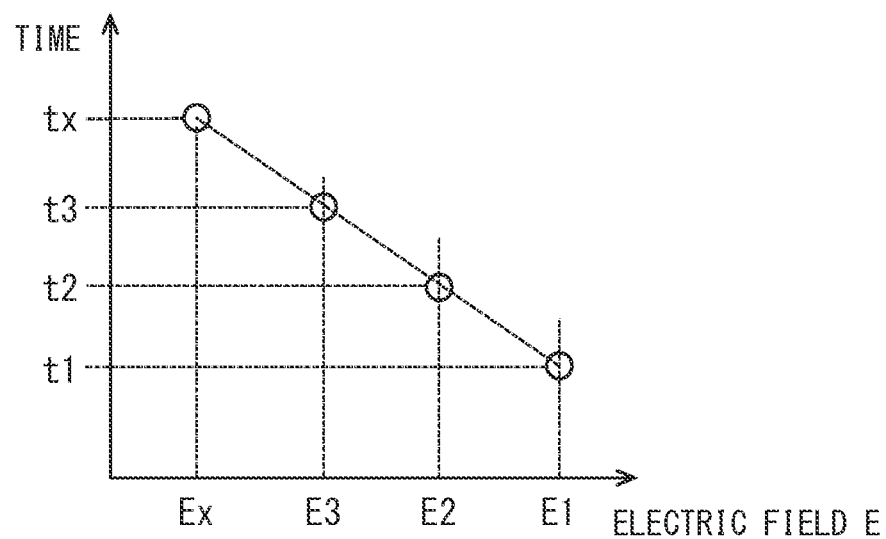
FIG. 14 is a diagram illustrating a prediction of a failure time of first cells.

Next, a failure prediction method will be described with reference to FIGS. 12 to 14. FIG. 12 is a flowchart illustrating an example of the failure prediction method. FIG. 13 is a diagram illustrating failure detection. FIG. 14 is a diagram illustrating prediction of a failure time of the first cells.

In the present embodiment, when the semiconductor element 15 is driven, failure of the second cells 142 is also detected. As illustrated in FIG. 12, the process is started by a driving instruction of the semiconductor element 15, and first, the gate drive voltage is applied to drive the semiconductor element 15 (step S400). Specifically, the gate drive voltage is applied from the gate drive power source 80 to the first pad 301. That is, the gate drive voltage is applied to the gate electrodes 27 of the first cells 141. In addition, the gate drive voltage is applied to the gate electrodes 27 of the second cells 142 for which the corresponding fuses 35 do not melt, that is, the second cells 142 in which failure has not occur. The first cells 141 and the non-failed second cells 142 operate and function as the semiconductor element 15.

Next, monitoring of the gate current Igs is started by the current sensor 82 (step S401), and it is determined whether or not failure has occurred in the second cells 142 based on the gate current (step S402). When the failure has occurred, a time until the failure occurs is stored (step S403), and when no failure occurs, step S402 is repeatedly executed.

As illustrated in FIG. 13, the gate current increases with deterioration in the gate insulating films of the second cells 142. When a short circuit occurs between the gate and the source due to the breakdown of the gate insulating films 26, a current exceeding the rated current value flows through the fuses 35 and the fuses 35 melt, and the gate current rapidly decreases. In the present embodiment, as an example, the time until the gate current value rapidly changes from large to small, that is, the time until the fuses 35 melt is stored as the operation time until the second cells 142 fail. The operation time is a cumulative application time of the gate drive voltage until the second cells 142 fail. When the gate current exceeds a predetermined threshold value, it may be determined that the second cells 142 have failed. In this case, the time until the gate current exceeds the threshold value may be set as the operation time.

When the second cells 142 fail, the gate electrodes 27 of the failed second cells 142 are electrically isolated from the gate electrodes 27 of the other main cells 14 by melting of the fuses 35. That is, the gate drive voltage cannot be applied to the gate electrodes 27 of the failed second cells 142.

Next, it is determined whether or not all the second cells 142 have failed (step S404). When there remains the second cells 142 that have not failed, the processes of step S402 and subsequent steps are executed again. In the case of the present embodiment, the processes of step S402 and subsequent steps are repeatedly executed until all of the three types of second cells 142a, 142b, and 142c fail. When there is only one second cell 142, the process inevitably proceeds to step S405.

As described above, the second cells 142a, 142b, and 142c are different from each other in the breakability of the gate insulating film. Also in the present embodiment, the thicknesses of the gate insulating films 26 are different from each other as in the preceding embodiments. Therefore, as illustrated in FIG. 13, the operation time of the second cells 142a having the thinnest gate insulating film 26 is t1. The operation time of the second cells 142b having the second thinnest gate insulating layer 26 is t2 (>t1). The operation time of the second cells 142c having the thickest gate insulating film 26 among the second cells 142 is t3 (>t2). In this way, there is a difference in operation time until failure occurs. The times t1, t2, and t3 correspond to the failure time of the second cells 142.

Next, the failure time of the first cell 141 is predicted based on the failure times of all the second cells 142 (step S405), and the series of processes ends.

For example, an electric field E that is a breakdown voltage limit of the gate insulating film 26 of each of the first cells 141 and the second cells 142 can be calculated in advance by device simulation as long as the structure is determined. Therefore, breakdown fields of the second cells 142a, 142b, and 142c are prepared as E1, E2, and E3, and a breakdown field of the first cells 141 is prepared as Ex, and the obtained times t1, t2, and t3 are used to perform two-dimensional plotting as illustrated in FIG. 14. Accordingly, the time tx at which the dielectric breakdown of the first cells 141 occurs can be predicted. The time tx corresponds to the failure time of the first cells 141.

Summary of Third Embodiment

According to the failure prediction method of the semiconductor device 10 according to the present embodiment, the same gate drive voltage as that of the first cell 141 is also applied to the second cells 142 via the fuses 35 at the time of driving the semiconductor element 15 as in the preceding embodiment. The electrical characteristic is measured to detect failure of the second cells 142. Melting of the fuse 35 electrically isolates the gate electrodes 27 of the failed second cells 142 from the gate electrodes 27 of the first cells 141. Since the second cells 142 also function as the main cells 14 constituting the semiconductor element 15 until failure occurs in the second cells 142, it is possible to restrict a decrease in the utilization efficiency of a chip area, that is, a decrease in the utilization efficiency of the semiconductor element 15.

In addition, the electrical characteristics are measured to detect failure of the second cells 142 due to energization during driving. As described above, when the semiconductor element 15 is driven, the second cells 142 are driven in the same manner as the first cells 141. Thus, the second cells 142 fail due to the stress actually applied in the market. Therefore, it is possible to accurately predict failure of the first cells 141, that is, failure of the semiconductor element 15 based on the failure of the second cells 142.

In the present embodiment, the fuses 35 melt when the second cells 142 fail, and the gate electrodes 27 of the failed second cells 142 are electrically isolated from the first cells 141 so that the gate drive voltage is not applied. As a result, it is possible to restrict failure of the other main cells 14 due to the temperature rise caused by the failure of the second cells 142. That is, it is possible to accurately predict failure of the first cells 141 while maintaining the function as the semiconductor element 15.

According to the semiconductor device 10 of the present embodiment, the gate drive voltage common with the first cells 141 can be applied to the second cells 142 through the fuses 35 at the time of driving the semiconductor element 15. When the second cells 142 fail due to the breakdown of the gate insulating films 26, the fuses 35 melt, and the application of the gate drive voltages to the failed second cells 142 can be interrupted. That is, since the second cells 142 also function as the main cells 14 constituting the semiconductor element 15 until failure occurs in the second cells 142, it is possible to restrict s a decrease in the utilization efficiency of the semiconductor element 15.

In addition, the second cells 142 fail by operating together with the first cells 141 at the time of driving the semiconductor element 15. That is, the failure occurs due to stress actually applied in the market. Therefore, it is possible to accurately predict failure of the first cells 141, that is, failure of the semiconductor element 15 based on the failure of the second cells 142.

In the present embodiment, the failure time of the first cells 141 is predicted based on the failure times of the second cells 142. Since the second cells 142 are broken in time series as described above, the failure time of the first cells 141 can be predicted from the failure times of the second cells 142. In particular, in the present embodiment, since the failure times of the second cells 142 are used, the failure time of the first cells 141 can be predicted.

<Modifications>

In the present embodiment, an example in which the failure time of the first cells 141 is predicted based on the failure times of the second cells 142 (142a, 142b, 142c) has been described, but the present disclosure is not limited thereto. The failure time of the first cells 141 may be predicted based on the failure time of one type of the second cells 142.

The prediction (estimation) of the failure time of the first cells 141 is not limited to the above-described method. For example, when the thicknesses of the gate insulating films 26 are different from each other, the failure time of the first cells 141 may be calculated based on the ratio of the thicknesses of the gate insulating films 26 and the above-described operation time. In addition, the prediction may be performed using a nonlinear regression method.

In the configuration using the fuses 35, an example in which the failure time of the first cells 141 is predicted based on the failure times of the second cells 142 has been described, but the present disclosure is not limited thereto. In the configuration using the fuses 35, as in the preceding embodiment, when the number of the failed second cells 142 reaches a predetermined number, failure of the first cell 141 may be predicted. At this time, notification may be performed when failure of the first cells 141 is predicted.

In the configuration using the switches 34 or 84 described in the preceding embodiment, the failure time of the first cell 141 may be predicted based on the failure times of the second cells 142 as described in the present embodiment. For example, in the non-driving time process illustrated in FIG. 9, the failure time of the second cells 142, that is, the time until the failure may be stored in step S305, and the failure time of the first cells 141 may be predicted based on the failure time of the second cells 142 instead of the process of step S308.

After the failure time of the first cells 141 is predicted based on the failure times of the second cells 142, the notification may be performed according to the predicted failure time of the first cells 141. For example, the notification may be performed when the predicted failure time is reached, or may be performed when a predetermined time before the predicted failure time is reached.

Fourth Embodiment

The present embodiment is a modification of the preceding embodiments as a basic configuration and may incorporate description of the preceding embodiments. In the preceding embodiment, the gate insulating films 26 of the second cells 142 is made more easily broken than those of the first cells 141 by reducing the thicknesses of the gate insulating films 26. Alternatively, the gate insulating films 26 of the second cell 142 may be made more easily broken than those of the first cells 141 by adjusting deep regions periodically disposed in the drift region 21.

Figure 15:
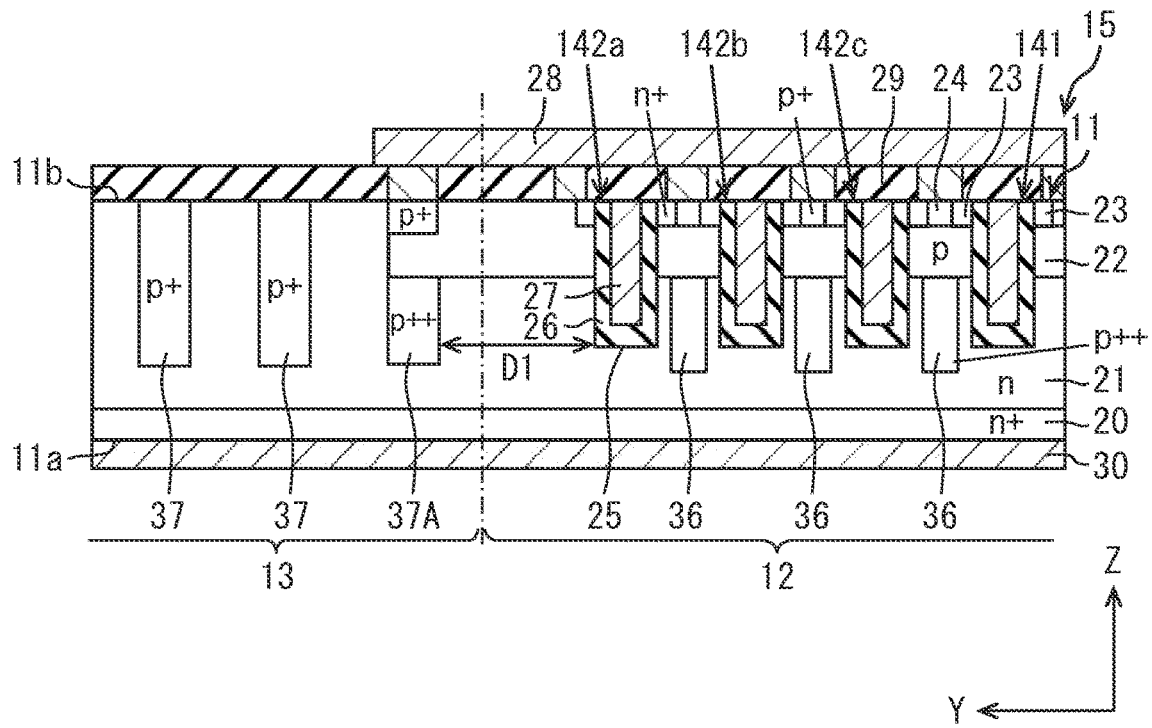
FIG. 15 is a cross-sectional view illustrating a semiconductor device according to a fourth embodiment.

FIG. 15 is a cross-sectional view illustrating a semiconductor device 10 according to the present embodiment. FIG. 15 is a cross-sectional view in which the line II-II shown in FIG. 1 is extended to the outer peripheral region 13. As illustrated in FIG. 15, the semiconductor device 10 further includes deep regions 36 and guard rings 37 in addition to the configuration illustrated in the preceding embodiments.

The deep regions 36 are periodically disposed in the drift region 21 in the main cell region 12. The deep regions 36 extend downward from the base region 22, that is, toward the drain region 20. The deep regions 36 extend to positions deeper than the trenches 25.

The deep regions 36 are p-conductivity type (p++) semiconductor regions having a higher impurity concentration than the base region 22 and the base contact region 24. The deep regions 36 are electrically connected to the source electrode 28 via the base region 22 and the base contact region 24. The deep regions 36 are disposed between the adjacent trenches 25 in the main cell region 12. The deep regions 36 extend in the X direction and are arranged in parallel with the trenches 25 in the Y direction.

The guard rings 37 are disposed in the drift region 21 in the outer peripheral region 13. The guard rings 37 are p-conductive semiconductor regions having a higher impurity concentration than the base region 22. Lower end positions of the guard rings 37 are substantially equal to lower end positions of the deep regions 36, for example. The guard rings 37 are disposed in multiple rings. Among the guard rings 37, a guard ring 37A located on the innermost side is a semiconductor region of a p-conductivity type (p++) having a higher impurity concentration than the other guard rings 37 (p+).

The guard rings 37A is connected with an end portion of the base region 22 located in the outer peripheral region 13. The guard ring 37A is disposed so as to have a predetermined distance D1 between the guard ring 37A and the trench 25 arranged at the end in the Y direction. The guard ring 37A is electrically connected to the source electrode 28 via the base region 22 and the base contact region 24. The other guard rings 37 except for the guard ring 37A are not in contact with the base region 22 and are disposed to have a predetermined depth from the rear surface 11b of the semiconductor substrate 11. The other guard rings 37 are not electrically connected to the source electrode 28.

Depletion layers spread starting from junctions. In addition, the depletion layers are less likely to spread with increase in the impurity concentration. When the deep regions 36 having a high impurity concentration and extending below the trenches 25 are disposed in the main cell region 12, electric field concentration is less likely to occur at lower portions of the trenches 25. In addition, when the impurity concentration of the guard ring 37A located on the innermost side is increased, electric field concentration is less likely to occur in the trench 25 at the end portion.

In the present embodiment, by intentionally controlling the distance D1 and/or the impurity concentration of the guard ring 37A, the gate insulating films 26 of the second cells 142 are more easily broken than those of the first cells 141. That is, by controlling the distance D1 and/or the impurity concentration of the guard ring 37A, the electric field is easily concentrated on the gate insulating films 26 of the second cells 142. For example, as the distance D1 increases, the electric field applied to the gate insulating film 26 at the end portion increases, and dielectric breakdown is likely to occur. Furthermore, as the impurity concentration of the guard ring 37A is lowered, the electric field applied to the gate insulating film 26 at the end portion becomes stronger, and dielectric breakdown is more likely to occur. Other configurations are similar to those described in the preceding embodiments.

Summary of Fourth Embodiment

According to the above-described structure, even if the trench structure including the gate insulating film 26 and the gate electrode 27 are common to the first cells 141 and the second cells 142, the gate insulating films 26 of the second cells 142 can be more easily broken than those of the first cells 141.

Fifth Embodiment

The present embodiment is a modification of the preceding embodiments as a basic configuration and may incorporate description of the preceding embodiments. In the preceding embodiments, the gate insulating films 26 of the second cells 142 are made more easily broken than those of the first cells 141 by reducing the thicknesses of the gate insulating films 26 as a whole. Alternatively, the gate insulating films 26 of the second cells 142 may be made more easily broken than those of the first cells 141 by locally reducing the thicknesses of the gate insulating films 26.

Figure 16:
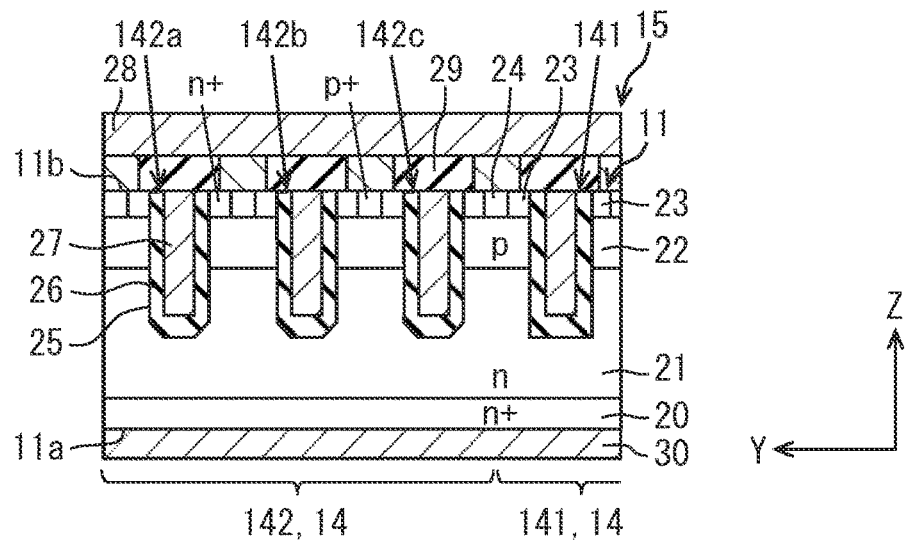
FIG. 16 is a cross-sectional view illustrating a semiconductor device according to a fifth embodiment.

FIG. 16 is a cross-sectional view illustrating a semiconductor device 10 according to the present embodiment. FIG. 16 is a cross-sectional view taken along the line II-II shown in FIG. 1. As illustrated in FIG. 16, in the present embodiment, in the second cells 142, corner portions between bottom walls and side walls of the trenches 25 have cutout shape. The cutout shape may be referred to as a chamfered shape, a tapered shape, or the like. Accordingly, the thicknesses of the gate insulating films 26 of the second cells 142 are smaller than those of the first cells 141 in the cutout portions, and are substantially the same as those of the first cells 141 in the other portion. Other configurations are similar to those described in the preceding embodiments.

Summary of Fifth Embodiment

When the above-described structure is adopted, it is possible to reduce or eliminate the variation in the threshold voltage Vth due to the difference in the thickness of the gate insulating film 26 between the first cells 141 and the second cells 142. On the other hand, since the electric field concentrates on the cutout portions, the gate insulating films 26 of the second cells 142 can be more easily broken than those of the first cells 141.

Other Embodiments

The disclosure in this specification, the drawings, and the like is not limited to the exemplified embodiments. The disclosure encompasses the illustrated embodiments and modifications by those skilled in the art based thereon. For example, the disclosure is not limited to the combinations of components and/or elements shown in the embodiments. The disclosure may be implemented in various combinations. The disclosure may have additional portions that may be added to the embodiments. The disclosure encompasses omission of components and/or elements of the embodiments. The disclosure encompasses the replacement or combination of components and/or elements between one embodiment and another. The disclosed technical scopes are not limited to the description of the embodiments. It should be understood that a part of disclosed technical scopes are indicated by claims, and the present disclosure further includes modifications within an equivalent scope of the claims.

The disclosure in the specification, the drawings and the like is not limited by the description of the claims. The disclosures in the specification, the drawings, and the like encompass the technical ideas described in the claims, and further extend to a wider variety of technical ideas than those in the claims. Therefore, various technical ideas can be extracted from the disclosure of the specification, the drawings and the like without being limited to the description of the claims.

What is claimed is:

1. A failure prediction method of a semiconductor device that includes a semiconductor element having a trench gate structure configured by connecting main cells in parallel, the main cells including first cells and second cells, the second cells having a structure in which gate insulating films are more easily broken by energization than gate insulating films in the first cells in order to predict failure of the first cells, a number of the second cells being smaller than a number of the first cells, the gate insulating films in the second cells are different in breakability from each other, the failure prediction method comprising:
applying a gate drive voltage in common to gate electrodes of the first cells and gate electrodes of the second cells at a time of driving the semiconductor element;
measuring an electrical characteristic and detecting failure of the second cells due to energization at the time of driving;
electrically isolating the gate electrodes of one or more of the second cells that have failed from the gate electrodes of the first cells so that the gate drive voltage is not applied to the one or more of the second cells that have failed; and
predicting the failure of the first cells based on the failure of the second cells.

2. The failure prediction method of the semiconductor device according to claim 1, further comprising predicting a failure time of the first cells based on a failure time of the second cells.

3. The failure prediction method of the semiconductor device according to claim 1, wherein
the failure of the first cells is predicted on condition that a number of the second cells that have failed reaches a predetermined number.

4. The failure prediction method of the semiconductor device according to claim 1, further comprising
performing notification according to a prediction of the failure of the first cells.

5. The failure prediction method of the semiconductor device according to claim 1, further comprising:
at the time of driving, applying the gate drive voltage in common to the first cells and the second cells by turning on a first switch connected to the gate electrodes of the first cells and turning on second switches connected to the gate electrodes of the second cells;
at a time of non-driving the semiconductor element, measuring an electrical characteristic while turning off the first switch and applying the gate drive voltage to only one or more of the second cells for which one or more of the second switches are turned on and detecting the failure of the second cells due to energization at the time of driving; and
electrically isolating the one or more of the second cells that have failed from the first cells by turning off one or more of the second switches corresponding to the one or more of the second cells that have failed.

6. The failure prediction method of the semiconductor device according to claim 1, further comprising:
at the time of driving, applying the gate drive voltage to the gate electrodes of the second cells through fuses, and applying the gate drive voltage to the gate electrodes of the first cells without passing through fuses;
detecting the failure of the second cells due to energization at the time of driving by measuring an electrical characteristic at the time of driving; and
electrically isolating the one or more of the second cells that have failed from the first cells by melting of one or more of the fuses due to the failure of the second cells.

7. A semiconductor device including a semiconductor element having a trench gate structure configured by connecting main cells in parallel, the semiconductor device comprising:
a semiconductor substrate including a main cell region and an outer peripheral region surrounding the main cell region, the main cell region being a region where the main cells are disposed and including first cells and second cells as the main cells, the second cells having a structure in which gate insulating films are more easily broken by energization than gate insulating films in the first cells in order to predict failure of the first cells, a number of the second cells being smaller than a number of the first cells;
gate pads disposed on one surface of the semiconductor substrate for applying a gate drive voltage to gate electrodes of the main cells, the gate pads including a first pad connected to the gate electrodes of the first cells and second pads disposed separately from the first pad and connected to the gate electrodes of the second cells; and
switches including a first switch connected to the first pad and second switches connected to the second pads, individually disposed for the gate pads, and configured to allow or block application of the gate drive voltage to the gate pads, wherein
at a time of driving the semiconductor element, all of the switches are turned on when no failure has occurred in the second cells, and only one or more of the second switches corresponding to one or more of the second cells that have failed are turned off and remaining switches in the switches are turned on when failure has occurred in the second cells, and
at a time of non-driving the semiconductor element, the first switch is turned off and one or more of the second switches are turned on.

8. A semiconductor device including a semiconductor element having a trench gate structure configured by connecting main cells in parallel, the semiconductor device comprising:
a semiconductor substrate including a main cell region and an outer peripheral region surrounding the main cell region, the main cell region being a region where the main cells are disposed and including first cells and second cells as the main cells, the second cells having a structure in which gate insulating films are more easily broken by energization than gate insulating films in the first cells in order to predict a failure of the first cells, a number of the second cells being smaller than a number of the first cells;
gate pads disposed on one surface of the semiconductor substrate for applying a gate drive voltage to gate electrodes of the main cells, the gate pads including a first pad connected to the gate electrodes of the first cells and second pads disposed separately from the first pad and connected to the gate electrodes of the second cells; and
fuses individually connecting the second pads and the first pad, wherein
the fuses are configured such that, in association with failure of one or more of the second cells, one or more of the fuses that are connected to one or more of the second pads corresponding to the one or more of the second cells melt.

\* \* \* \* \*